UNITED STATES PATENT OFFICE.

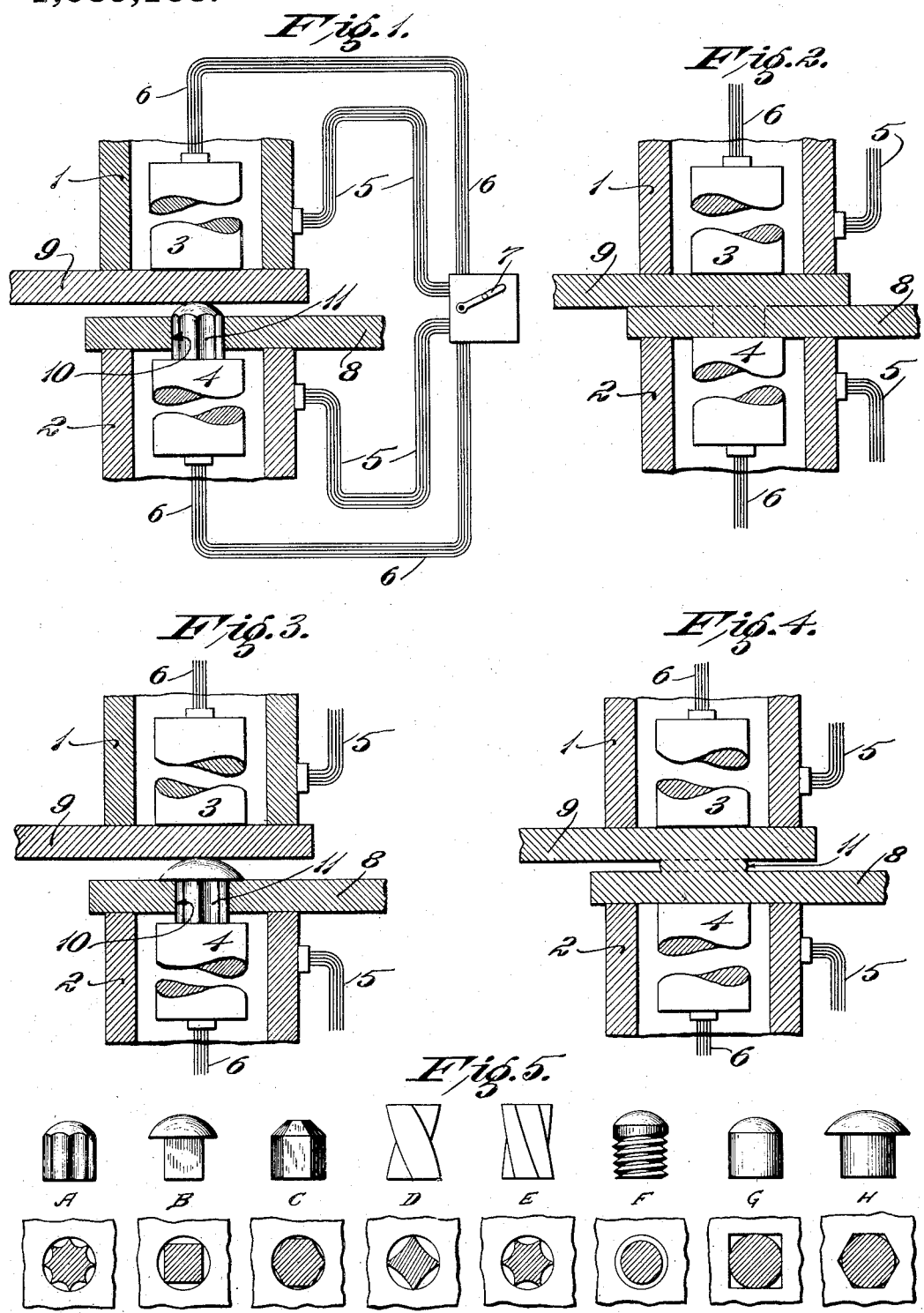

ALBERT L. JOHNSON, OF HAMBURG, NEW YORK.

PROCESS OF ELECTRIC WELDING.

1,039,138.   Specification of Letters Patent.   Patented Sept. 24, 1912.

Application filed April 17, 1912. Serial No. 691,471.

*To all whom it may concern:*

Be it known that I, ALBERT L. JOHNSON, a citizen of the United States, and a resident of the town of Hamburg, county of Erie, and State of New York, have invented a new and useful Process of Electric Welding, of which the following is a specification.

My invention relates to a process of electric welding and has for its principal objects to effect a proper joining of metal plates without decreasing their tensile or compressive strength; to facilitate the positioning of the joint and to effect a proper joint rapidly and economically.

The invention consists principally in projecting a metal insert through one of the members to be welded and against the other member and welding said insert to said first member sidewise and to said second member endwise.

It also consists in arranging the two members to be welded in an electric circuit wherein they are connected by a metal insert whose end is in contact with one of said members and whose side is in contact with the other, and then welding the parts together in this relation.

It also consists in projecting a metal insert through a hole in one of the two members to be welded so that the side of the insert is in contact with one member and its end is in contact with the other member, said members being otherwise out of contact and then welding the parts together in this relation, meanwhile effecting pressure endwise of said insert.

It also consists in projecting through a hole in one of the members to be welded a metal insert which has a comparatively small area of contact with the wall of said hole, bringing the second member into contact with the projecting end of said insert, connecting said members to the opposite electrodes of a welding current, meanwhile effecting endwise pressure on said insert.

It also consists in the operations hereinafter described.

In the accompanying drawing, which forms part of this specification, and wherein like symbols refer to like parts wherever they occur, Figure 1 is a diagrammatic view illustrating the relation, at the beginning of the operation, of the electrodes to the two metal plates to be welded together; Fig. 2 is a similar view at the close of the operation; Fig. 3 is a view similar to Fig. 1 showing a different design of rivet or metal insert; Fig. 4 shows the condition at the end of the operation corresponding to Fig. 3; and Fig. 5 illustrates various designs of rivets or inserts and their relation to the holes provided for them in one of the plates or members to be joined.

In carrying out the present process, a suitable electric welding machine is used; which it is unnecessary to describe in detail. This welding machine is preferably equipped with two sets of electrodes, one set 1, 2 of which may, for the purpose of distinguishing them from the other set, be designated as preliminary electrodes. The other set of electrodes 3, 4 may be designated as the pressure electrodes. The pressure electrodes are in the form of pressure jaws arranged opposite each other, while the preliminary electrodes are preferably annular or tubular and are arranged concentric with the pressure electrodes. The preliminary electrodes and the pressure electrodes are located in separate circuits 5, 6 or branches of the same circuit; and the circuit controllers 7 are so arranged that the current first passes through the preliminary electrodes and subsequently through the pressure electrodes.

One of the metal plates or members 8, 9 to be welded together has one or more holes 10 punched therein at a desired place or places; while the other metal plate or member 9 is left imperforate. The two plates are then placed in proper relative position in the welding machine, but spaced slightly apart and with a fluted rivet or insert 11 in the hole of the perforated plate. With the plates in this relation, the electric current is applied first through the preliminary electrodes and immediately thereafter through the pressure electrodes, pressure being meanwhile applied to said pressure electrodes. On account of the contact surface of the preliminary electrodes being of considerable area and concentrically arranged, the electrical resistance to the current through said electrodes is concentrated on the metal inserts and the portions of the plates nearest thereto, that is, on the wall or margin of the hole of one plate and on the small area of the other plate opposite the end of said insert. The effect of this current on the insert is to soften the end and side ribs or angles thereof to the condition for welding, and the adjacent portions of the plates are likewise softened. The application of the current through the pressure electrodes with the simultaneous application of the endwise pressure on the rivet or insert has the effect of shortening the length of the rivet or insert and causing the lateral expansion of the rivet or insert so as to fill the hole and weld its side to the wall of the rivet hole. At the same time, the projecting end of the rivet in contact with the imperforate plate has effected a concentration of the welding current on a small area of said imperforate plate, and the end of the rivet is firmly and securely welded to said imperforate plate. The pressure endwise of the rivet has the effect of moving the plates closer together or into actual contact as may be required and subject to proper proportioning of the parts and the duration of the operation is prolonged or shortened.

Obviously, the form of rivet may be varied to suit the requirements of the designer. By enlarging the portion of the rivet between the two plates, it may be made to determine the proper spacing of the plates in the finished article. For instance, with the design of rivet or insert illustrated in Fig. 1, the voids or spaces between the insert and the wall of the hole are sufficient to allow the inner projecting portion of the rivet to be forced back into the hole; in consequence of which the plates ultimately contact flatwise with each other. On the other hand, rivets of the type illustrated in Fig. 2, that is, a headed rivet, the projecting metal is in excess of the voids, and, in the finished article, the plates are spaced apart.

It is desirable that, whatever the form of the rivet may be, its area of contact with the wall of the hole should be comparatively small, in order that there should be an initial concentration of the current. Fig. 5 illustrates a number of typical forms of rivets together with their relation to the hole with which they are intended to coöperate. In like manner, the end of the rivet should be convex or otherwise shaped so as to have a small area of contact with the plate. So, too, in the case of very thick members, it may be desirable to form the hole only partially through the same.

Among the principal advantages of the present process, is the fact that in the finished article the original perforated plate regains the tensile and compressive strength that it had before it was perforated. Another advantage is that by positioning the rivet in the rivet hole, the proper relation of the plates to each other, with particular reference to the location of the weld, can be determined with great accuracy and facility. Another important advantage is that the conditions affecting the welding of the rivet to one plate are capable of control to a considerable extent independently of the conditions affecting the operation of welding the same rivet to the other plate. In this way, it is a comparatively simple matter to control the conditions of the operation so as to adapt them for joining plates of different thicknesses.

Obviously, the process hereinbefore described admits of considerable variation without departing from my invention.

What I claim is:

1. The process of joining metal members which consists in forming a hole in one of said members and placing a metal insert therein with its end projecting therefrom, placing an imperforate portion of the second member against the end of said insert, and electrically welding said insert to said members.

2. The process of joining metal members which consists in forming a hole in one of said members and placing a metal insert therein with its end projecting therefrom, placing a second member against the end of said insert, and electrically welding said insert to said members under endwise pressure, the side wall of said insert having ribs to contact with the wall of the hole, and the voids between the insert and the wall of the hole being of sufficient volume to permit the projecting portion of the rivet to be forced into the hole during the welding operation.

3. The process of joining metal members which consists in arranging a metal insert to project through a hole in one member and bear endwise against an imperforate portion of the other member and electrically welding the parts together by passing an electric current through the perforated member, said insert and said second member serially.

4. The process of joining metal members which consists in projecting a metal insert through one of said members and into contact endwise with an imperforate portion of the other member, passing an electric current from said first mentioned member through said insert and thence through said second mentioned member.

5. The process of joining metal members which consists in projecting a metal insert through one of said members and into contact endwise with an imperforate portion of the other member, passing an electric current from said first mentioned member through said insert and said second mentioned member serially, said insert being meanwhile submitted to endwise pressure.

6. The process of joining metal members which consists in projecting a metal insert through one of said members and into contact with the other member, and passing an electric current from said first mentioned member through said insert and said second mentioned member serially, said insert being initially in contact with said first mentioned member along only a comparatively small area of the side surface of said insert.

7. The process of joining metal members which consists in projecting a metal insert through one of said members and into contact with the other member, and passing an electric current from said first mentioned member through said insert and said second mentioned member serially, said insert being of polygonal section with its angular portions substantially in contact with the wall of the hole in the first mentioned member.

8. The process of securing metal members together which consists in arranging a metal insert in a hole provided therefor in one of said members and projecting therethrough into contact with the other member, the members being meanwhile spaced apart, passing an electric current from the perforated member through the insert and the other member serially, and then passing an electric current endwise through the rivet and the imperforate member, meanwhile maintaining pressure endwise of the insert.

9. The process of securing metal members together which consists in arranging a metal insert in a hole provided therefor in one of said members and projecting therethrough into contact with the other member, the members being meanwhile spaced apart, passing an electric current from the perforated member through the insert and the other member serially, and then passing an electric current endwise through the rivet and the imperforate member, meanwhile maintaining pressure endwise of the insert, said insert initially having angular projections in contact with the wall of the hole, whereby voids are formed between said insert and the wall of the hole into which the metal may be pressed during the welding operation.

Signed at St. Louis, Missouri, this 13th day of April, 1912.

ALBERT L. JOHNSON.

Witnesses:
EDGAR T. FARMER,
M. A. SHELTON.